Dec. 14, 1937.   B. W. TWYMAN   2,102,296
STEERING GEAR
Filed Nov. 11, 1935   2 Sheets-Sheet 1

INVENTOR
B. Wickliffe Twyman
BY
Wheeler, Wheeler & Wheeler
ATTORNEYS

Dec. 14, 1937. B. W. TWYMAN 2,102,296
STEERING GEAR
Filed Nov. 11, 1935  2 Sheets-Sheet 2
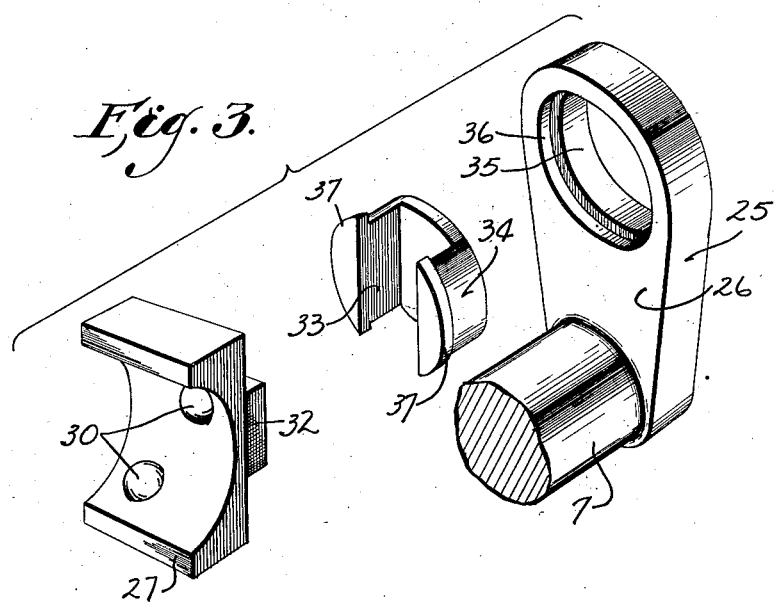
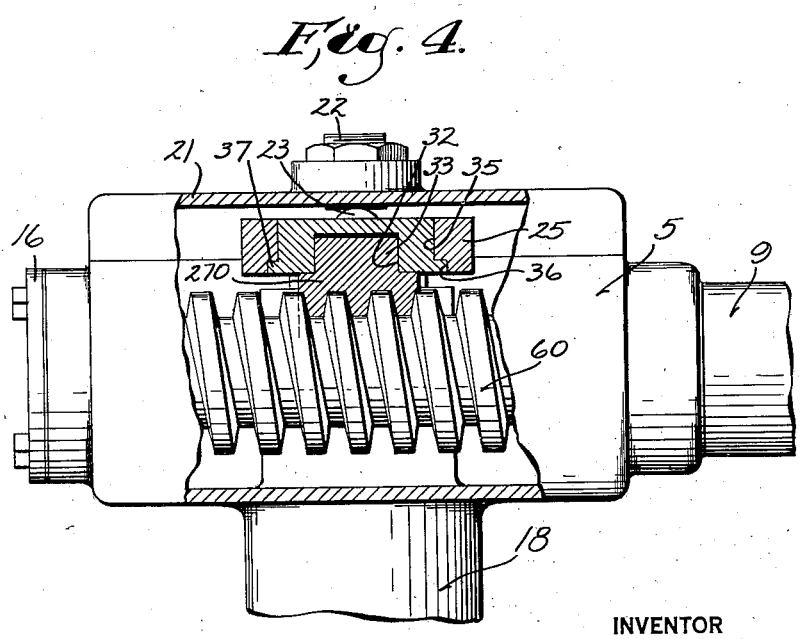
INVENTOR
B. Wickliffe Twyman
BY
Wheeler, Wheeler and Wheeler
ATTORNEYS Patented Dec. 14, 1937

2,102,296

UNITED STATES PATENT OFFICE 2,102,296

STEERING GEAR

B. Wickliffe Twyman, Milwaukee, Wis., assignor to Lavine Gear Company, Milwaukee, Wis., a corporation of Wisconsin Application November 11, 1935, Serial No. 49,144

3 Claims. (Cl. 74—499)

This invention relates to improvements in steering gears.

It is the primary object of the invention to render more compact a steering gear of the type herein disclosed and to minimize the torque or twisting moment developed between the cam follower and the rocker arm by consolidating the bearing surfaces between these parts without reducing the area of surfaces in contact, the rocker arm having a bearing directly on the face of the cam follower and having an oscillatory bearing element recessed into the rocker arm within which the thrust transmitting boss or stud of the cam follower has a sliding bearing contact.

It is a further object of the invention to improve and reduce the cost of the casing structure and bearing arrangement of the steering gear.

In the drawings:

Figure 3 is an enlarged detail in perspective showing in "exploded" relation the component parts of the bearing structure.

Figure 4 is a view partially in plan and partially in horizontal section showing a gear modified as to the type of thread employed between the worm cam and cam follower.

Like parts are designated by the same reference characters throughout the several views.

Figure 1:
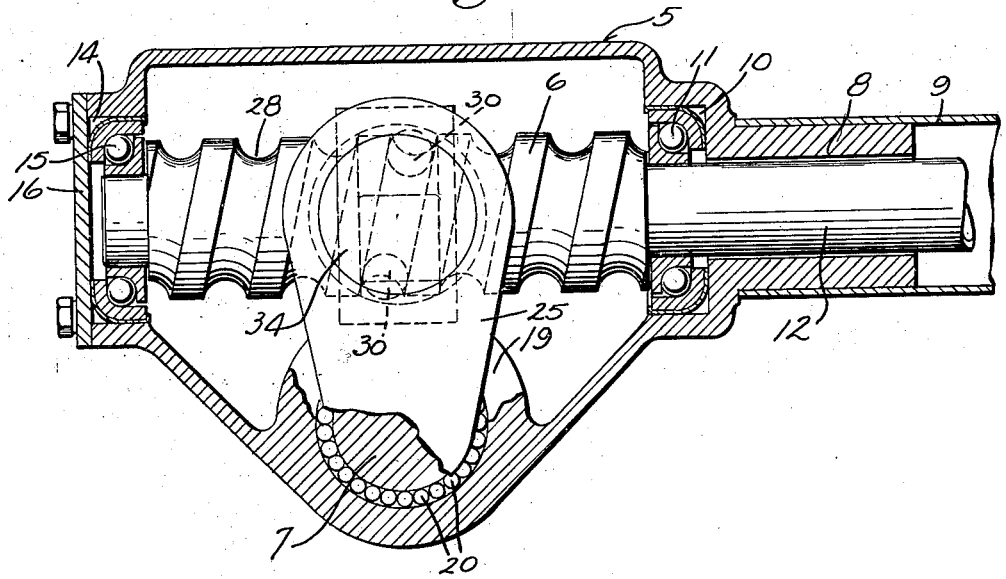
Figure 1 is a view in axial section through a gear embodying the invention.

The casing 5 integrally provides supports for all bearings (other than thrust bearings) of the worm cam 6 and the rock shaft 7. Adjacent the sleeve-like extension 8 about which the steering column 9 is fitted, the casing 5 has an annular shoulder 10 for the anti-friction bearing 11 in which the steering shaft 12 is journaled at one end to support the worm cam. At its other end the casing 5 has a bore 14 the same size as recess 10 in which an antifriction bearing 15 similar to the bearing unit 11 is disposed and is held by a removable cap 16.

From the rear side of casing 5 projects a bearing and mounting sleeve 18 which is extended at 19 into the interior of the casing to provide an elongated tubular bearing surface which serves as an outer race for the needle bearings 20 in which the rock shaft 7 is oscillated.

The parts for transmitting motion from the worm cam 6 to the rock shaft 7, as hereinafter to be described, are rendered accessible by a removable wall portion 21 of the gear casing. This removable wall contains an adjusting screw 22 for a thrust bearing which includes a bore 23 socketed into the end of the rock shaft 7, the arrangement being such that by turning up screw 22 the operator is able to adjust the bearing surfaces of the gear.

The rocker arm 25 is preferably integral with rock shaft 7. It has a bearing surface at 26 in face contact with a complementary surface on the cam follower 27, whereby the thrust of the adjusting screw 22 is transmitted to the cam follower to maintain its position respecting the worm cam 6.

In the preferred form of the invention the worm cam 6 has a threaded groove 28 of circular cross section with which mesh the ball threads 30 of the cam follower 27. The balls are simply socketed in the cam follower as clearly shown in Figures 2 and 3 at the proper points to conform to the pitch of the groove 28. The hardened surfaces of the balls adapt them to serve as threads. They are not necessarily anti-friction devices since it is immaterial whether they turn in their sockets.

It is important to the device that the plane in which the rocker arm 25 oscillates shall be brought as closely as possible toward the periphery of the worm cam 6 to minimize torsional stress and friction losses. At the same time, it is desired to provide broad areas of bearing surface between the cam follower 27 and the rocker arm to withstand the heavy bearing pressures to which steering gears are subject in the manipulation of wheels with large size tires. It is also required that the bearing between these parts be such as to accommodate the relative oscillation occasioned by the swinging of the rocker arm during the manipulation of the gear.

Accordingly, the present invention contemplates the use of a flat sided rectangular block or boss at 32 on the cam follower which has a sliding bearing in the diametrical guideway 33 of a swivelled bearing member 34 oscillatable in the bearing 35 which is provided in the rocker arm 25. The whole range of reciprocation of the boss or block 32 in the guideway 33 does not exceed the diameter of the swivelled bearing element 34.

Thus the boss 32 may be located inside of the bearing element 34 which in turn is located inside of the arm 25, thus bringing all of these parts into one plane.

I prefer to confine the swivel bearing element 34 by counterboring the rocker arm 25 at 36 to receive a radial flange 37 which is continuous about the inner margin of the swivel element 34 except where interrupted by the transverse slot or guideway 33. The inner face of the swivel bearing element 34 seats against the outer bearing surface on the cam follower 27, the swivel bearing element 34 being thus confined against axial displacement in either direction.

Figure 2:
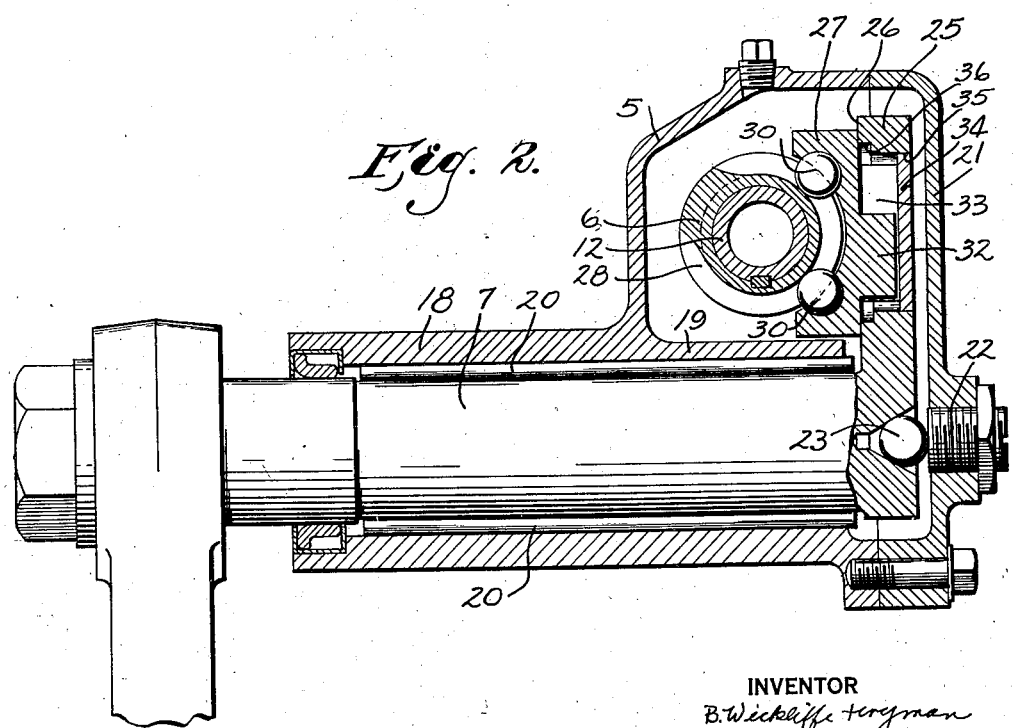
Figure 2 is a view taken in transverse section through the gear of Figure 1.

In the construction shown in Figure 4 the arrangement is identical with that above described except that the worm cam 60 here comprises a screw with a conventional acme thread and the cam follower 270 has been modified only to the extent of having a complementary thread in lieu of the balls 30 shown in Figures 2 and 3.

It will be noted from Figures 2, 3, and 4 that the amount of metal connecting the upper and lower sides of the cam follower is reduced to a minimum to bring the rocker arm as close as possible to the worm cam. The close approach of the rocker arm to the worm cam is of course greatly increased by the arrangement whereby the bearing elements 32 and 34 are all located in the same plane as the rocker arm, the block 32 being wholly within the oscillatory swivel bearing element 34.

I claim:

1. In a steering gear the combination with a worm cam and a rock shaft having a rocker arm member oscillatory adjacent the worm cam, of cam follower member having a portion interposed between said worm cam and arm with its external face in bearing contact with the arm, a bearing block fixed on one of said members and elongated in the direction of the radius of said arm, and a swivel element journaled in the other of said members and provided with a transverse slot in which said block is reciprocable in the relative movement of said members.

2. In a steering gear, a motion receiving assembly comprising the combination with a transversely bored rocker arm having a counterbore adjacent its inner surface, of a swivel element provided internally with a transverse guideway, said swivel element being provided with a bearing in said first mentioned bore, and having a radial flange engaged in the counterbore.

3. In a steering gear, the combination with a cam follower and a rocker arm having bearing surfaces in direct contact, said rocker arm having a bore and counterbore extending through it from its adjacent bearing surface, of a swivel bearing element rotatable in the bore and having a flange engaged in the counterbore and confined by the bearing surface of the cam follower aforesaid, said swivel element having a transverse guideway, and a block carried by the cam follower and projecting from its said bearing surface into said guideway and complementary to the sides thereof.

B. WICKLIFFE TWYMAN.